Dec. 25, 1956 J. L. RENNICK 2,775,691

TRIGGERED GATING SYSTEM

Filed Sept. 19, 1951

*INVENTOR:*
JOHN L. RENNICK
BY Francis W. Crotty
HIS ATTORNEY.

United States Patent Office 2,775,691

Patented Dec. 25, 1956

2,775,691

TRIGGERED GATING SYSTEM

John L. Rennick, Elmwood Park, Ill., assignor to Zenith Radio Corporation, a corporation of Illinois Application September 19, 1951, Serial No. 247,316

4 Claims. (Cl. 250—27)

Figure 1:
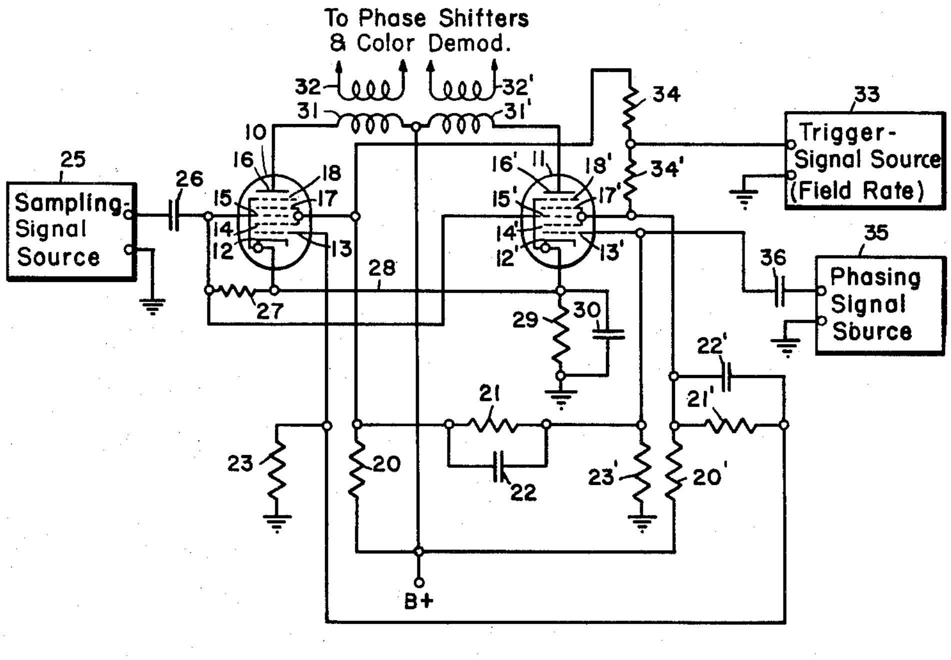

This invention pertains to a triggered gating circuit which, for convenience, may be defined as an arrangement with at least two electron-discharge devices or vacuum tubes employed as wave-signal repeaters and interconnected to perform a triggering function such that signal translation through both tubes is determined by a triggering phenomena which gates, or renders conductive, only one of the tubes for any given operating instant. The invention is especially well suited for use in a color television system and will be described in that connection.

In the particular television system to which this invention may be advantageously applied, the transmission of the color telecast includes both a brightness signal which is the counterpart of the video information transmitted in a monochrome system as well as a so called "color subcarrier" which conveys chromaticity information as distinguished from brightness data. When adapted to a transmission channel having a pass-band of 6 megacycles, the brightness signal includes the full frequency range of video information extending usually from 0 to 4 megacycles while the color subcarrier is modulated only in accordance with the relatively low-frequency portion of the information derived in the scanning process, being limited for the most part to a band from 0 to .5 megacycle. While the brightness signal is developed in response to the conjoint effect of the color cameras which scan an image to be translated in the three primary color fields, the color subcarrier may be considered as transmitting two separate quantities which may, for example, represent the output signal of the red-color camera minus a selected portion of the brightness signal and the output signal of the blue-color camera minus the same portion of the brightness signal. These two quantities, which may be demonstrated to convey complete chromaticity information, effect both amplitude and phase modulation of the color subcarrier and may be likened to in-phase and quadrature-phase components of the subcarrier.

At the receiver, the transmission is utilized by applying the brightness signal to the intensity-control electrode of an image-reproducing device, such as a tri-color tube. The several components conveying the chromaticity information are derived from the subcarrier in suitable demodulators and are employed to establish saturation and hue of color in the reproduced images. Inasmuch as the present invention is not concerned with the overall television system, per se, a further description thereof is considered unnecessary.

It has been found that contamination or color cross talk may be introduced into such a system due to phase errors resulting from the components of the system or incorrect phasing of the locally generated subcarrier employed in the color demodulators at the receiver. It has further been found that these and like defects may be materially reduced if the color phase sequence is oscillated, that is, considering the subcarrier to have in-phase and quadrature-phase components as referred to above, a periodic phase reversal of the quadrature component effects oscillation of the color phase sequence and improvement from disturbances manifesting phase errors of the type mentioned. Preferably, the color phase sequence oscillates at the field scanning rate of the system. Of course, if oscillating color sequence is employed, the phase change, whether it be a phase reversal or some other preselected phase shift introduced at the transmitter, must likewise be employed at the receiver. There are a variety of methods for practicing oscillating color phase sequence, particularly at the receiver. For example, a compensating and periodic phase change may be applied to the locally generated subcarrier before its application to the color demodulator which demodulates the information represented by the quadrature-phase component; it may be introduced subsequent to that demodulator; or may be provided in the path over which the transmitted color subcarrier is delivered to the demodulator. As proposed thus far, the phase change is accomplished by a network of two wave-signal repeaters which may be of the type 6AS6 gated or rendered conductive under the control of a binary counter or trigger circuit employing cross-coupled triodes. Arrangements of that type necessitate the use of at least four vacuum tubes and represent a considerable increase in cost particularly from the standpoint of the construction of the receiver.

It is, therefore, an object of the present invention to provide a triggered gating circuit which is of simple and inexpensive construction.

A more particular object of the invention is to provide an improved and simple triggered gating circuit for use in a color television system to effect periodic phase changes of the color subcarrier or other signal employed in the transmission of chromaticity information.

A triggered gating circuit embodying the invention and as applied to a color television system which has a certain field-scanning frequency and which utilizes a signal subjected to periodic phase changes in translating chromaticity information, comprises a pair of electron-discharge devices, preferably pentagrid vacuum tubes. Each such tube has at least a cathode, first, second and third electrodes, and an anode disposed in the recited order along a common electron path. The second electrode of each device is established at a positive potential with respect to the cathode thereof to function as a collector electrode and a network cross couples the aforesaid second or collector electrode of each such device to the first electrode of the other, providing a trigger circuit which has two stable operating conditions in each of which one of the devices is gated and rendered conductive while the other is substantially non-conductive. The circuit includes means for applying the aforementioned signal between the cathode and third electrode of each of the devices to be translated therethrough during operating intervals when such device is gated to be conductive, and there is a balanced output circuit for each device coupled between the anodes of the two devices. Means are coupled to the output circuit for deriving an output signal of a predetermined phase during operating intervals in which one of the devices is conductive and for deriving an output signal in phase opposition to the first-mentioned output signal during operating intervals in which the other device is conductive. Additionally, the arrangement includes means for applying actuating pulses having a repetition frequency corresponding to the field-scanning frequency of the television system to the trigger circuit to gate the discharge devices alternately and at the field-scanning frequency.

Figure 2:
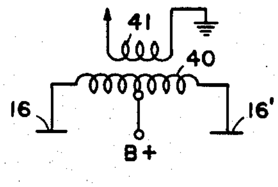

The features of the present invention, which are believed to be novel, are set forth with particularity in the appended claims but the organization and manner of operation, together with further objects and advantages thereof, may best be understood by reference to the following description taken in connection with the accompanying drawing in which:

Figure 1 is a schematic diagram representing one embodiment of a triggered gating circuit in accordance with the invention, and Figure 2 represents a modification of the output circuit of the arrangement of Figure 1.

Referring now more particularly to Figure 1, the arrangement there represented is a triggered gating circuit for selectively effecting signal translation through a pair of signal paths which paths extend from electron-discharge devices or vacuum tubes 10 and 11. More particularly, the triggered gating circuit under consideration comprises a portion of the receiver of a color television system which has a given field-scanning frequency and which utilizes a signal, such as a sampling or subcarrier signal, subjected to periodic phase changes in translating color information. Those phase changes are accomplished by gating tubes 10 and 11 in a manner to be described presently.

Each of these tubes is, preferably, of the pentagrid type and their electrode systems are identical. Tube 10, for example, has a cathode 12, a first electrode 13, a second electrode 14 usually employed as a collector when this tube serves its more conventional role as a pentagrid converter, a third electrode 15, and an anode 16 disposed in the recited order along a common electron path. Usually, there is also a screen electrode 17 internally connected to electrode 14 and a suppressor 18 similarly connected to cathode 12. Corresponding electrode elements of tube 11 are identified by similar reference characters primed. Each of the collector electrodes 14 and 14' is maintained at a positive potential with respect to its associated cathode by a source of operating potential designated +B coupled thereto through dropping resistors 20 and 20', the other or low-potential terminal of that source being connected to ground.

The arrangement further comprises a network establishing a direct-current cross-coupling connection from the collector electrode of each device to the first signal electrode of the other device to provide a trigger circuit having two stable operating conditions in each of which one of the devices is gated and rendered conductive while the other is substantially non-conductive. This network includes a resistor 21 connecting collector electrode 14 of tube 10 to the first signal grid 13' of tube 11 and a resistor 21' connecting collector electrode 14' of tube 11 to the first signal grid 13 of tube 10. These resistors may be shunted, respectively, by condensers 22 and 22' to compensate the effect of spray capacitance and accelerate the trigger action. The first signal electrodes of tubes 10 and 11 are also connected to ground through resistors 23 and 23'.

The subcarrier or sampling signal to be subjected to periodic phase changes is supplied by a source 25 and is applied in push-push relation between the cathode and the aforesaid third electrode of each of the tubes to be translated therethrough during operating intervals when either tube is gated to be conductive. For convenience of nomenclature, these electrodes 15 and 15' may be referred to as the second signal grid of each tube and they are connected to source 25 through a condenser 26. The input circuits for the tubes are completed by a resistor 27 connected between the second signal grid of tube 10 and its cathode, a conductive connection 28 between the cathodes, and a resistor 29 connecting the cathodes to ground and by-passed for signals of the sampling or subcarrier frequency by a condenser 30.

Each tube also has an output circuit coupled to its anode and cathode and shown as comprising a pair of inductors 31 and 31', having one terminal connected to the anode of one of the tubes and having a common terminal connected to the source of operating potential to establish the anode of each tube at a positive potential with respect to its cathode. Additional means are coupled to the output circuits of the tubes for deriving an output signal from the triggered gating circuit with a phase that is determined for any operating instant by which one of the tubes is gated to be conductive, this means being represented in Figure 1 as other inductors 32 and 32' inductively coupled with inductors 31 and 31', respectively. The polarity of the connections from output inductors 32 and 32' determines whether or not the signals derived therefrom are in phase or out of phase and where phase relations other than these are desired, the output inductors 32 and 32' may be coupled to the color demodulator through other phase-shifting networks (not shown).

Another signal source 33 applies an actuating signal to the trigger circuit to gate tubes 10 and 11 in a sequence determined by the actuating signal. In the application under consideration, source 33 provides a pulse-modulated signal, comprising pulses which occur at the field-scanning rate of the television system, to gate the tubes in alternation at the field-scanning frequency and, to that end, the actuating pulses are applied with positive polarity and in push-push relation to the collector electrodes 14 and 14' of the tubes through resistors 34 and 34'. In most installations it is desirable not only to establish a preselected gating sequence for the tubes but also a particular phase relation through which that sequence is followed. More specifically, in applying the circuit under consideration to the receiver of a color television system employing an oscillating color phase sequence, it is necessary properly to phase the phase changes introduced by the triggered gating circuit with the phase changes of the transmission and a suitable phasing signal may be obtained in response to the line-synchronizing pulses and field-synchronizing pulses of the system during each field interval wherein the leading edge of the field-synchronizing pulse occurs in time coincidence with a line-synchronizing pulse. For the double-interlaced scanning commonly employed in present-day telecasting, this condition occurs at every other scanning field and source 35 may be considered to generate such phasing pulses with positive polarity and with a repetition rate of half the field frequency. This source is coupled to the first signal grid 13' of tube 11 through a coupling condenser 36. It will be understood, that the triggering pulses as well as phasing pulses may be individually applied to both of the tubes but the described arrangement is more simple and is believed to be a more expedient solution to the problem of triggering and phasing.

In considering the operation of the triggered gating circuit of Figure 1, it will be assumed initially that the operating condition of the trigger circuit is one in which tube 10 is conductive while tube 11 is non-conductive. For that condition, the sampling signal is translated from source 25 through conductive tube 10 to the color demodulator by way of the inductively coupled impedances 31 and 32. The circuit remains as described until the occurrence of the next succeeding actuating pulse from source 33 which is concurrently applied to both tubes. It has no immediate effect on tube 10 which is already conductive but, as applied to tube 11, it initiates anode current flow, which heretofore had been interrupted, in the trigger portion comprising electrodes 12', 13', and 14'. The initiation of current flow in tube 11 applies a signal variation of negative polarity to first signal grid 13 of tube 10 through the cross connection or feed back provided by resistor 21' and condenser 22' to reduce current flow in tube 10. A decrease of current flow in tube 10 increases the potential of signal grid 13' of tube 11 due to the cross coupling connection, tending to increase the current flow in tube 11. This process is cumulative or regenerative and quickly biases tube 10 to cut off and gates tube 11, rendering it conductive. The trigger circuit remains in this, its second stable operating condition, until the next triggering pulse and until that time the translation of the sampling signal from source 25 is through tube 11 and coupling impedances 31' and 32'. The phase of the output signal delivered to the color demodulator is then determined by the coupling inductors 31' and 32' and by the characteristics of such coupling networks as may intervene between inductor 32' and the demodulator. Inasmuch as the trigger actuating pulses occur at the field-scanning rate and may even conveniently constitute field-synchronizing pulses obtained from the field-sweep system of the receiver, tubes 10 and 11 are gated in alternation at the field-scanning frequency to subject the signal from source 25 to such phase changes as may be desirably established in the output circuits of the tubes 10 and 11 and the associated circuitry. The phasing pulse from source 35 controls the conductivity of tube 11 to phase the trigger sequence should that be necessary.

In introducing the subject invention, reference has been made to the type of system wherein the color subcarrier is considered to comprise an in-phase and a quadrature-phase component in which case an oscillating color phase sequence may be conveniently established by reversing the phase of the quadrature-phase component at the field rate. The modified output circuit of Figure 2 is particularly well suited to that operation. In this modification, anode 16 of tube 10 and anode 16' of tube 11 are connected to opposite ends of a distributed parameter time delay network including an inductor 40 having a center tap conductively connected to potential source +B. The output signal from the triggered gating circuit is derived through an inductor 41 inductively coupled to the time delay network. For this embodiment, since the gated tubes drive opposite ends of the time delay network, the phase of the output signal is reversed as the tubes are gated and rendered conductive alternately.

Merely by way of illustration, and in no sense limiting the construction of the triggered gating circuit, one embodiment of the type shown in Figure 1 found to have satisfactory operating characteristic employed the following components:

| | |
|---|---|
| Tubes **10, 11** | Type 6BE6. |
| Resistors **20, 20'** | 27,000 ohms. |
| Resistors **21, 21', 23, 23', 27** | 220,000 ohms. |
| Condensers **22, 22'** | 50 micro-microfarads. |
| Resistor **29** | 22,000 ohms. |
| Condenser **30** | 0.01 microfarad. |
| Resistors **34, 34'** | 47,000 ohms. |

The described arrangement is a simple and inexpensive circuit which accomplishes at one and the same time the functions of triggering and gating while employing only two conventional tubes. In the illustrated arrangement, a common input signal is applied to both tubes but it will be understood that separate input signals may be applied to the signal grids 15, 15' of the tubes and separate output circuits may be connected to the anodes 16, 16' because they are not involved in the trigger action.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A triggered gating circuit for a color television system which has a given field-scanning frequency and which utilizes a signal subjected to periodic phase changes in translating color information comprising: a pair of electron-discharge devices of the pentagrid type individually including a cathode, first and second signal electrodes, a collector electrode between said signal electrodes, and an anode; means for establishing the collector electrode of each of said devices at a positive potential with respect to the cathode thereof; a network cross coupling the collector electrode of each said device to the first signal electrode of the other device to provide a trigger circuit having two stable operating conditions in each of which one of said devices is gated and rendered conductive while the other is substantially non-conductive; means for applying said signal between the cathode and the second signal electrode of each of said devices to be translated therethrough during operating intervals when such device is gated to be conductive; a balanced output circuit coupled between the anodes of said devices; means coupled to said balanced output circuit for deriving an output signal of a predetermined phase during operating intervals when one of said devices is conductive and for deriving an output signal in phase opposition to said first-mentioned output signal during operating intervals when the other of said devices is conductive; and means for applying actuating pulses, having a repetition frequency corresponding to said field-scanning frequency, to said trigger circuit to gate said devices in alternation and at said field-scanning frequency.

2. A triggered gating circuit for selectively effecting signal translation through a pair of signal paths comprising: a pair of electron-discharge devices individually having at least a cathode, first, second and third electrodes and an anode disposed in the recited order along a common electron path; means for establishing the second electrode of each of said devices at a positive potential with respect to the cathode thereof; a network cross coupling the second electrode of each said device to the first electrode of the other device to provide a trigger circuit having two stable operating conditions in each of which one of said devices is gated and rendered conductive while the other is substantially non-conductive; means for applying between the cathode and the third electrode of each of said devices a signal to be translated therethrough during operating intervals when such device is gated to be conductive; an output circuit for each of said devices coupled to the anode and cathode thereof; and means for applying a pulse-modulated actuating signal in push-push relation to the second electrode of each of said devices to gate said devices in a sequence determined by said actuating signal.

3. A triggered gating circuit for selectively effecting signal translation through a pair of signal paths comprising: a pair of electron-discharge devices individually having at least a cathods, first, second and third electrodes and an anode disposed in the recited order along a common electron path; means for establishing the second electrode of each of said devices at a positive potential with respect to the cathode thereof; a network cross coupling the second electrode of each said device to the first electrode of the other device to provide a trigger circuit having two stable operating conditions in each of which one of said devices is gated and rendered conductive while the other is substantially non-conductive; means for applying between the cathods and the third electrode of each of said devices a signal to be translated therethrough during operating intervals when such device is gated to be conductive; a balanced output circuit coupled between the anodes of said devices; means, including means for applying an actuating signal to both of said devices, for gating said devices between said stable operating conditions in a sequence determined by said actuating signal; means coupled to said balanced output circuit for deriving an output signal of a predetermined phase during operating intervals when one of said devices is conductive and for deriving an output signal in phase opposition to said first-mentioned output signal during operating intervals when the other of said devices is conductive; and means, including means for applying an additional actuating signal to said trigger circuit for phasing the gating sequence of said devices with respect to a reference condition.

4. A triggered gating circuit for selectively effecting signal translation through a pair of signal paths comprising: a pair of electron-discharge devices of the pentagrid type individually including a cathode, first and second signal electrodes, a collector electrode between said signal electrodes and an anode; means for establishing the collector electrode of each of said devices at a positive potential with respect to the cathods thereof; a network cross coupling the collector electrode of each said device to the first signal electrode of the other device to provide a trigger circuit having two stable operating conditions in each of which one of said devices is gated and rendered conductive while the other is substantially non-conductive; means for applying between the cathode and the second signal electrode of each of said devices a signal to be translated therethrough during operating intervals when such device is gated to be conductive; an output circuit for each of said devices comprising a distributed-parameter time-delay network including an inductor connected at opposite ends to the anodes of said devices; and means for applying an actuating signal to said trigger circuit to gate said devices in a sequence determined by said actuating signal.

References Cited in the file of this patent

UNITED STATES PATENTS

| | | |
|---|---|---|
| 2,189,317 | Koch | Feb. 6, 1940 |
| 2,534,232 | Cleeton | Dec. 19, 1950 |

FOREIGN PATENTS

| | | |
|---|---|---|
| 510,216 | Great Britain | July 26, 1939 |